Figure 10:
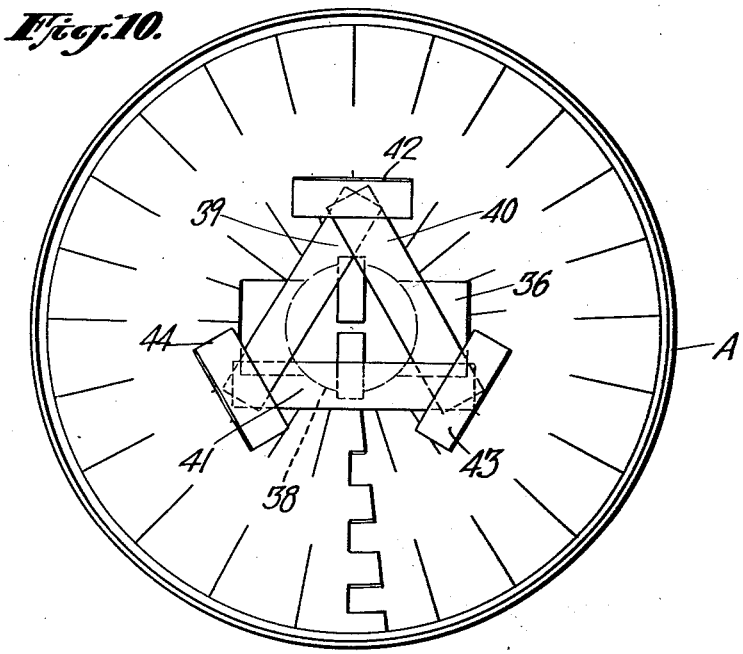

July 18, 1933.  M. G. TARTER ET AL  1,918,496
POTTERY AND METHOD OF MAKING THE SAME
Original Filed April 15, 1929  8 Sheets-Sheet 1
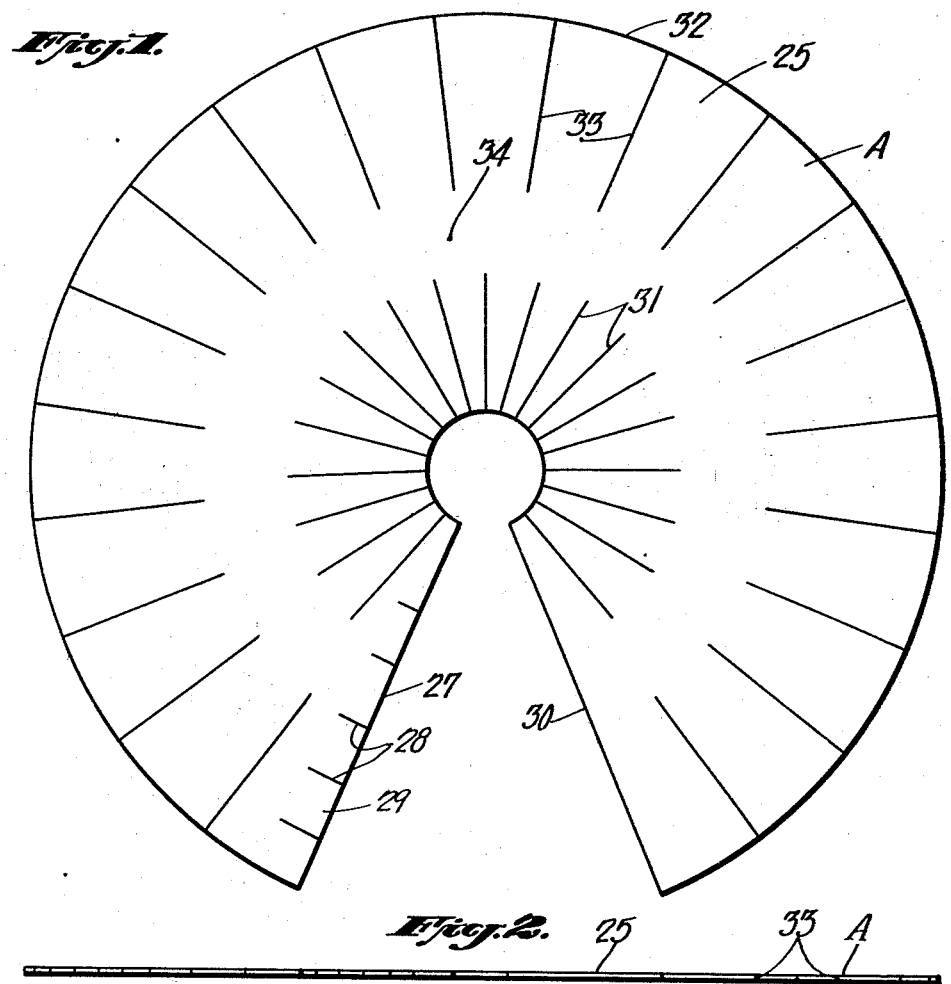
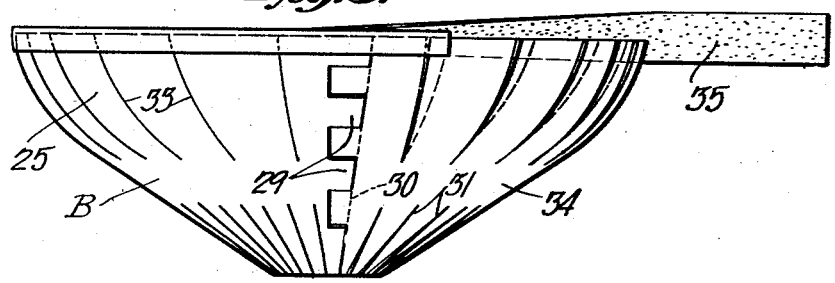
Inventor
MAE G. TARTER.
ALBERT L. ROSE.
By Clarence A. O'Brien
Attorney July 18, 1933.  M. G. TARTER ET AL  1,918,496
POTTERY AND METHOD OF MAKING THE SAME
Original Filed April 15, 1929   8 Sheets-Sheet 2
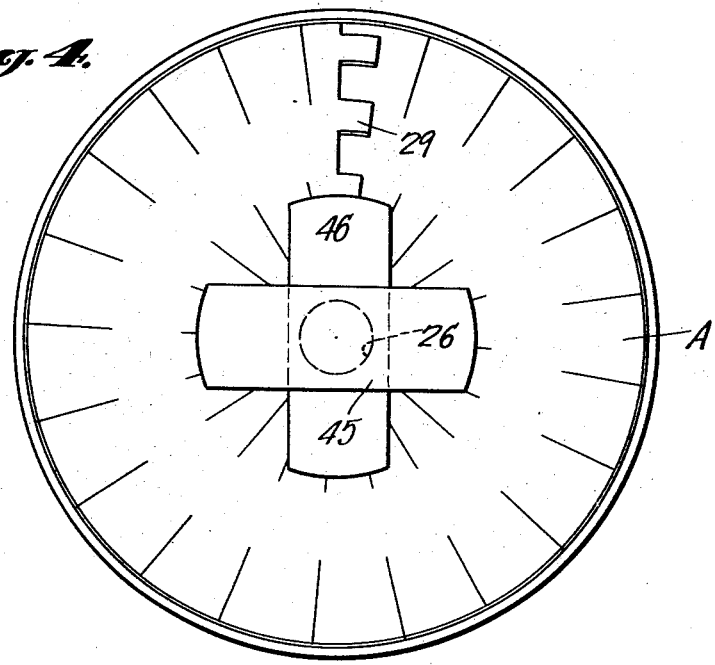
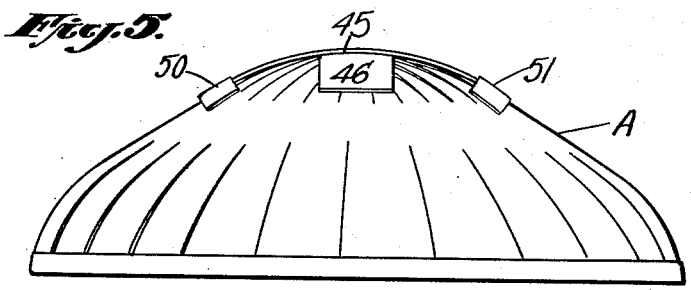
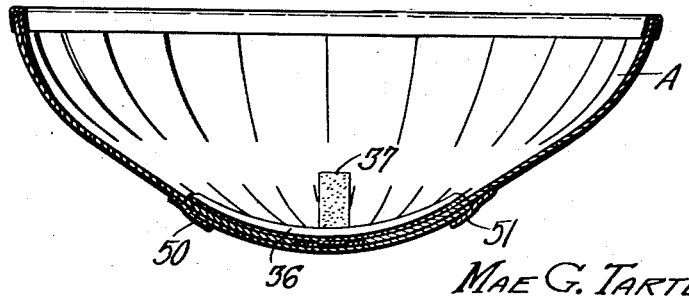
Inventor
MAE G. TARTER.
ALBERT L. ROSE.
By Clarence A. O'Brien
Attorney July 18, 1933.  M. G. TARTER ET AL  1,918,496
POTTERY AND METHOD OF MAKING THE SAME
Original Filed April 15, 1929   8 Sheets-Sheet 3
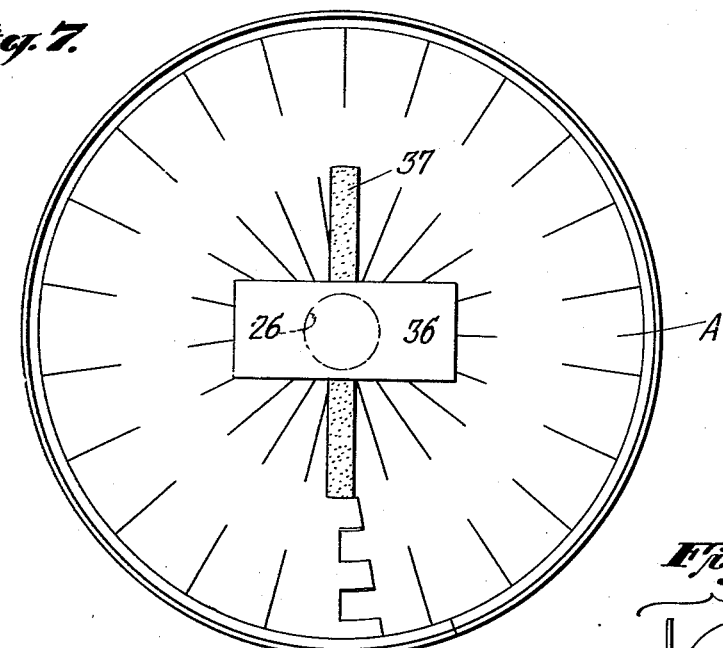
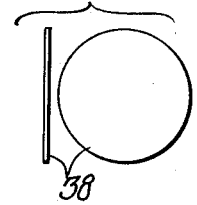
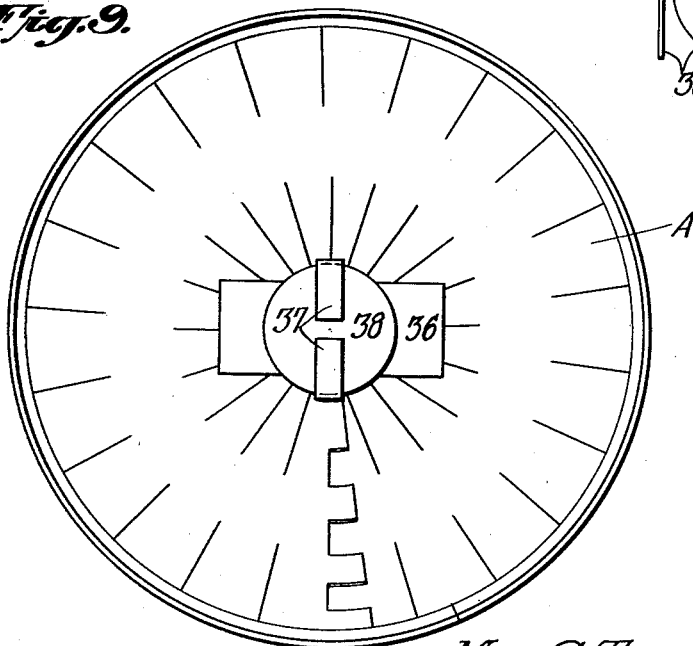
Inventor
MAE G. TARTER.
ALBERT L. ROSE.
By Clarence A. O'Brien
Attorney Inventors
MAE G. TARTER.
ALBERT L. ROSE.
By Clarence A. O'Brien
Attorney

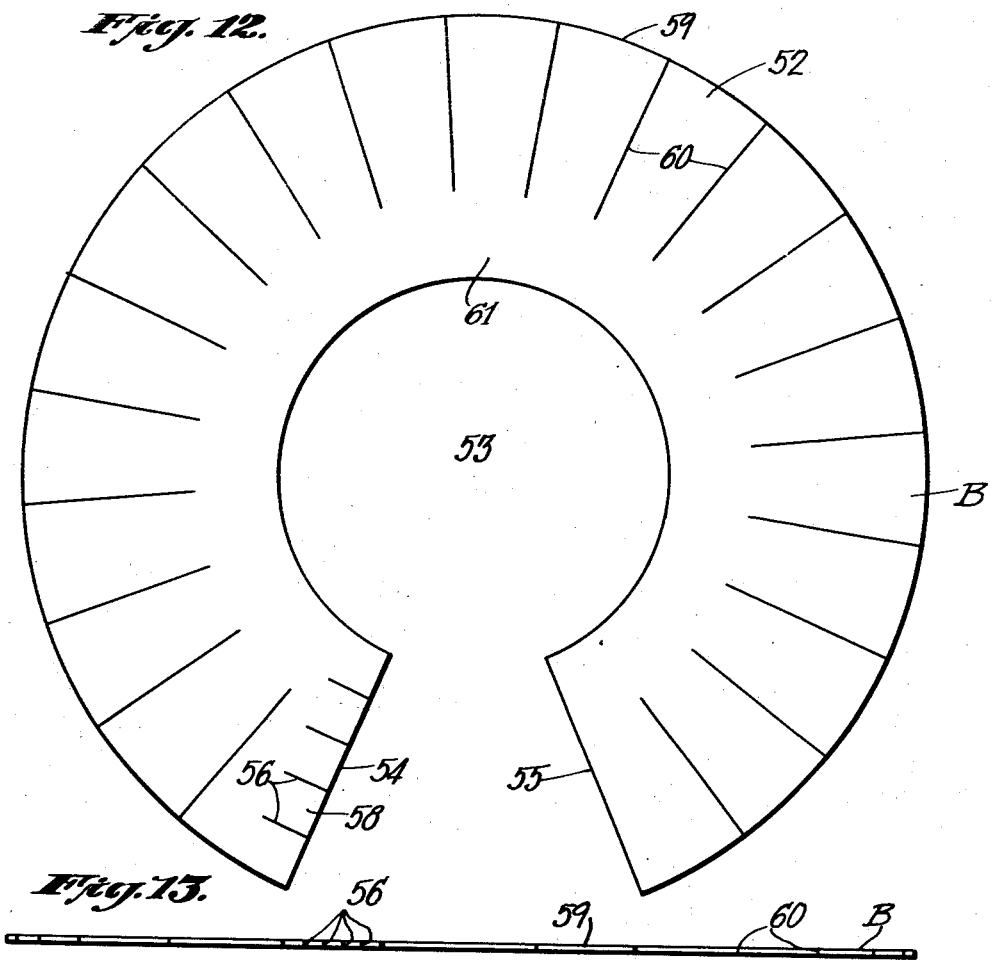

July 18, 1933.    M. G. TARTER ET AL    1,918,496
POTTERY AND METHOD OF MAKING THE SAME
Original Filed April 15, 1929    8 Sheets-Sheet 6

Inventor
MAE G. TARTER.
ALBERT L. ROSE

By Clarence A. O'Brien
Attorney

July 18, 1933.   M. G. TARTER ET AL   1,918,496
POTTERY AND METHOD OF MAKING THE SAME
Original Filed April 15, 1929   8 Sheets-Sheet 7

Inventors
MAE G. TARTER.
ALBERT L. ROSE.
By Clarence A. O'Brien
Attorney

July 18, 1933.  M. G. TARTER ET AL  1,918,496
POTTERY AND METHOD OF MAKING THE SAME
Original Filed April 15, 1929  8 Sheets-Sheet 8

Inventors
MAE G. TARTER.
ALBERT L. ROSE.

By Clarence A. O'Brien
Attorney

Patented July 18, 1933

1,918,496

UNITED STATES PATENT OFFICE

MAE G. TARTER AND ALBERT L. ROSE, OF PALM SPRINGS, CALIFORNIA

POTTERY AND METHOD OF MAKING THE SAME

Continuation of application Serial No. 355,218, filed April 15, 1929. This application filed January 21, 1933. Serial No. 652,879½.

This invention relates to earthenware or pottery articles and to a method of making such articles. A general object of the invention is to provide practical and attractive articles of pottery such as bowls, vases and the like, and a simple and effective method of making articles of this character.

This application is filed as a continuation of our application entitled Method of manufacturing pottery, Serial No. 355,218, filed April 15, 1929.

It is an object of the invention to provide articles of pottery that are inexpensive and that are highly attractive and ornamental.

Another object of the invention is to provide earthenware or pottery that may be manufactured or made very inexpensively, and which may closely resemble expensive or antique pieces.

Another object of the invention is to provide earthenware or pottery that may be manufactured or made very inexpensively to be exact or correct reproductions of historical Indian pottery articles. In accordance with the invention, it is easy and simple to reproduce the most difficult shapes and contours of such articles, making it possible to produce pottery having true Indian designs so that the native primitive art and culture may be perpetuated and preserved.

Another object of the invention is to provide a method of making articles of earthenware or pottery that may be successfully carried on by children and other persons unskilled in the ceramic arts.

It is another object of the invention to provide a method for making pottery that may be inexpensively carried on without special tools or apparatus.

It is another object of the invention to provide a simple, inexpensive method for making pottery that may be employed in the production of original or unique shapes and designs as well as in the production of copies or models of existing articles such as are displayed in shops, museums, etc.

It is another object of the invention to provide a method for making pottery that develops the skill and artistic talents of those employing it.

It is another object of the invention to provide blank forms of flexible material, for use in carrying out the method mentioned above, on which a clay or plastic material is to be placed or applied and that are constructed so that they may be given various shapes and contours. The blank forms provided by the present invention form the frame or base for carrying the pottery clay and are such that they may be shaped as desired prior to the application of the plastic material to give the finished article any desired configuration or design.

It is another object of the invention to provide forms, sections or blanks of the character mentioned that are simple and inexpensive of manufacture and commercially practical and that are adapted to be sold together with instructions for their use in carrying out the above mentioned method.

Figure 11:
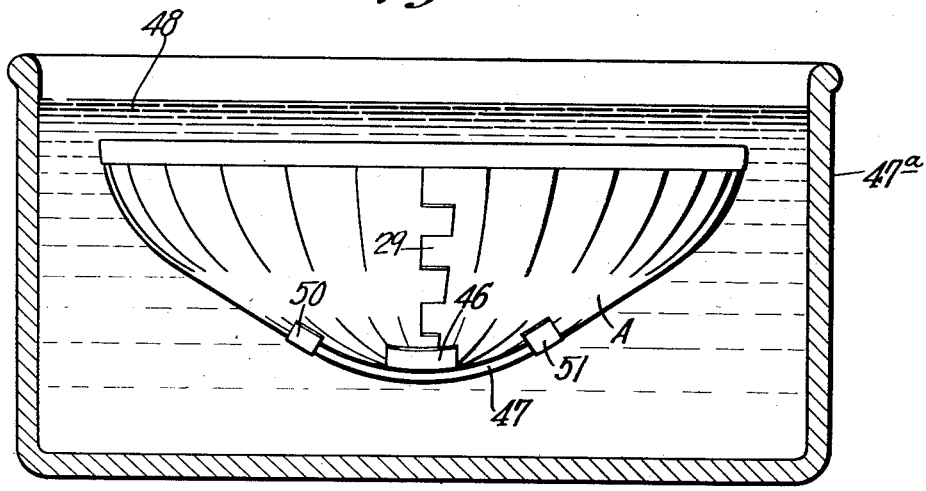
Figure 15:
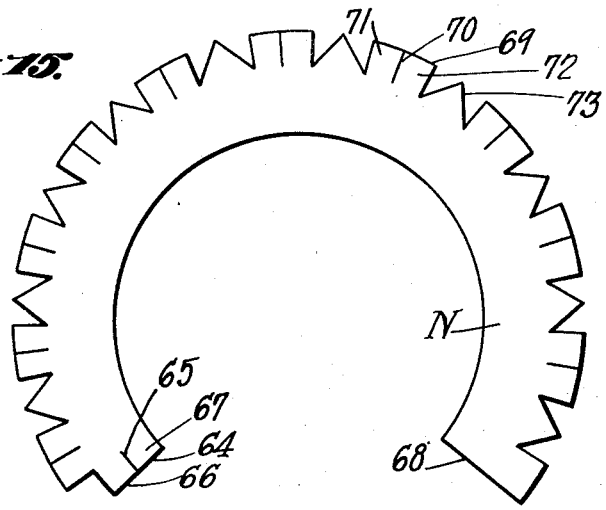
Figure 16:
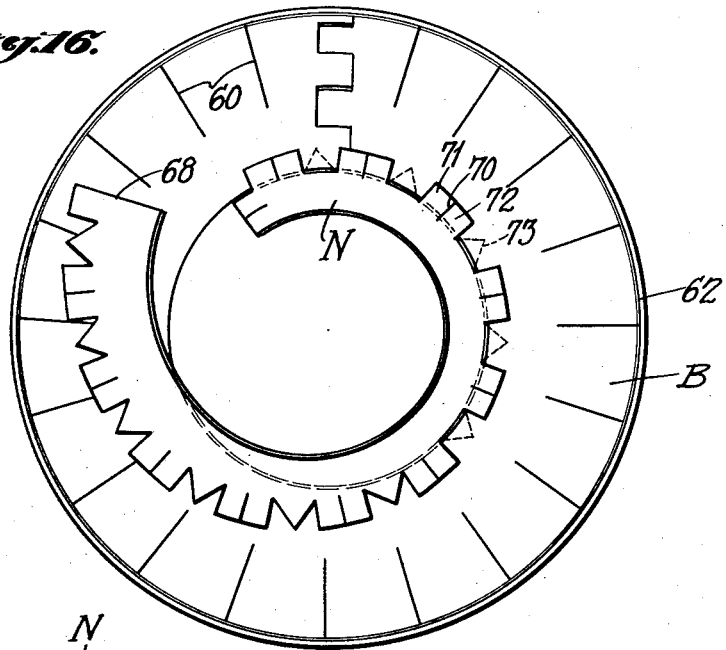
Figure 17:
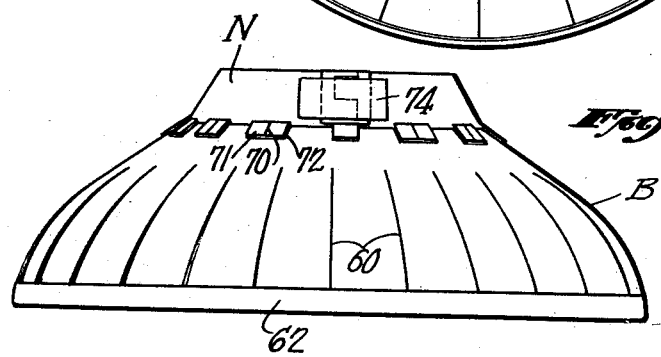
Figure 18:
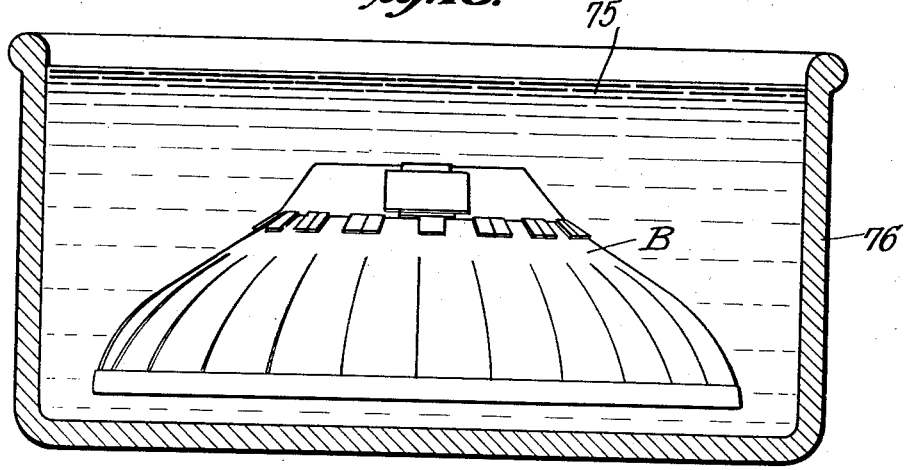
Figure 19:
Figure 20:
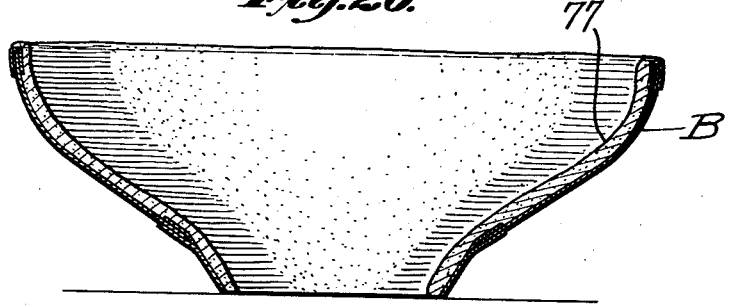
Figure 21:
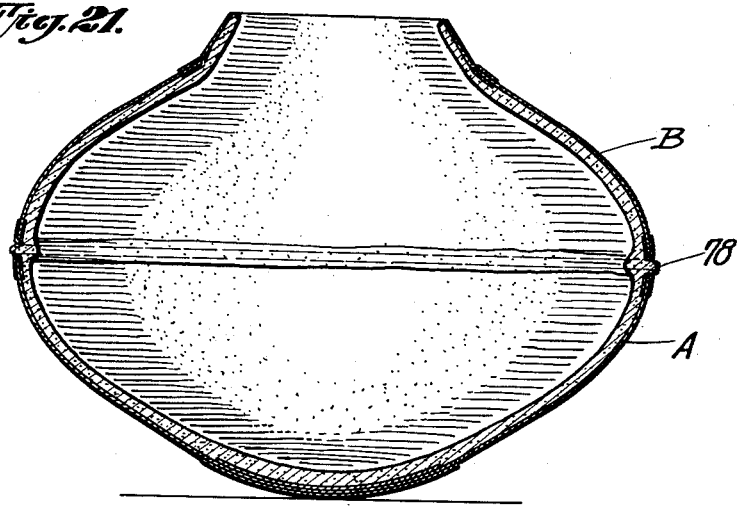
Figure 22:
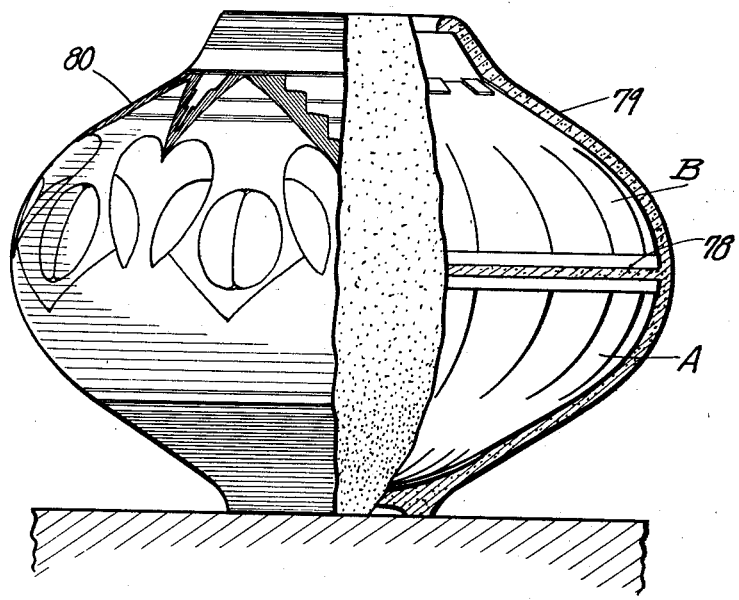

The various objects and features of the invention will be better and fully understood from the following detailed description of a typical embodiment of the invention and the manner of carrying out the method provided by the invention, throughout which description reference may be had to the accompanying drawings, in which:

Fig. 1 is a plan view of the lower section or form blank. Fig. 2 is an edge view of the form blank illustrated in Fig. 1. Fig. 3 is a side elevation of the form blank illustrated in Figs. 1 and 2 showing the method of shaping and assembling it. Fig. 4 is a bottom plan view of the form blank partially assembled. Fig. 5 is a side elevation of the assembled form blank or section. Fig. 6 is a vertical section view of the partially assembled lower section of the form. Fig. 7 is a top or plan view of the lower section of the form partially assembled. Fig. 8 is a plan and edge view of the reinforcing disc. Fig. 9 is a view similar to Fig. 7 illustrating the manner of applying or attaching the disc. Fig. 10 is a top or plan view of the lower form blank or section fully assembled. Fig. 11 is a vertical sectional view of a container holding hardening liquid for treating the lower section of the form. Fig. 12 is a top or plan view of the upper form section. Fig. 13 is an edge view of the upper form section. Fig. 14 is a side elevation of the upper form section illustrating the manner of assembling and shaping it. Fig. 15 is a top or plan view of the blank or form section for making the neck portion of the form. Fig. 16 is a top or plan view of the upper form section illustrating the manner of applying the neck section. Fig. 17 is a side elevation of the assembled upper section of the form. Fig. 18 is a vertical sectional view of a container holding hardening liquid for treating the upper form section. Fig. 19 is a vertical detailed sectional view of the lower form section illustrating it after it has received the inner coating of plastic material. Fig. 20 is a vertical detailed sectional view of the inverted upper form blank having the inner coating of clay or plastic material. Fig. 21 is a vertical detailed sectional view of the two form sections provided with the inner coating of pottery material and illustrating them in the assembled relation. Fig. 22 is a side elevation of the finished article with parts broken away to appear in section and to show a portion of the form in elevation.

The earthenware or pottery articles provided by the present invention may be varied greatly in size, character, configuration etc. Throughout the following detailed disclosure, we will describe one typical article and a typical preferred manner of carrying out the method of making it, it being understood that the invention is not to be considered as limited or restricted to the specific form or application about to be described, but is to be taken as including any features or modifications that may fall within the scope of the claims.

The pottery article illustrated in the drawings and embodying the features of the present invention includes, generally, a form A—B, a coating 49 of clay, or the like, on the inner side of the form, and a coating or covering 79 of clay, or the like, on the outer side of the form. It is believed that the structure and features of the article will be fully understood from a disclosure of the method provided by the invention, and therefore we will proceed with a detailed description of the method for producing the article.

The method provided by the present invention includes, generally, the provision of a base or form A—B, the shaping of the form or the giving of the form the desired configuration, treating the form to make it rigid, applying plastic material to the inner side of the form and then applying plastic material to the outer side of the form. The method as just briefly outlined is intended primarily for the making of an article involving a single form section or blank A, it being understood that where the form includes two or more principal sections A and B, that the form sections A and B may be individually treated or hardened and provided with the applications of clay or plastic material. Where the method is employed in the production of an article involving two or more main form sections, it includes the assembling and joining together of the form sections after the application of the inner layers of plastic material.

The base or form A—B is provided to carry or support the plastic material and is adapted to be shaped to give the article its general shape or contour. It is an important feature of the present invention that the form A—B is constructed so that it may be shaped as desired prior to the application of the inner and outer coatings of the plastic material. When the finished article is to be in the form of a bowl or the like, with a wide open upper end, the form may include a single main section A, and where the finished article is to be in the nature of a vase or jar as illustrated in the drawings, the form includes the two main sections, the lower section A and the upper section B. The blank pieces or sections A and B of the form are constructed of flexible or bendable material and are cut and shaped so that they may be readily given any desired symmetrical form or configuration. It has been found practical to construct the form sections A and B of paper, cardboard, parchment, or the like. The form sections A and B are initially normally flat plates or sheets as illustrated in the drawings. The present invention contemplates the manufacture of the form sections A and B on a commercial scale, and the sale of the form sections together with directions for their use in the making of pottery articles.

The form section A which is the lower part or section of the form is constructed of a blank 25 that is initially substantially C shaped in plan elevation having a peripheral edge 32 curved about a central point and a central opening 26 with an axis coincident with said point. The central opening 26 is preferably round as illustrated throughout the drawings. A gap or space extends outwardly from the opening 26 to the peripheral edge 32 and has radial edges 27 and 30. In accordance with the invention, the inner portion of the blank 25 is scored or cut to be readily contractable. In the case illustrated in the drawings, a plurality of radial slits or cuts 31 extend outwardly from the central opening 26. The cuts 31 are preferably equally spaced and of the same length. A plurality of radial slits or cuts 33 extend inwardly in the form section A from the peripheral edge 32 to make the peripheral portion of the form blank extensible and contractable. The cuts 33 are equally spaced apart and are in offset or staggered relation to the inner cuts 31. In accordance with the invention, the portions of the form section adjacent the edges 27 and 30 are adapted to be connected together, and novel means is provided to facilitate this connection. Spaced slits 28 are provided in the portion of the section adjacent the edge 27. The parts between the slits 28 constitute tabs 29. The lower form section A as just described may be formed of a single integral blank 25 of paper, parchment, or the like.

The method includes the act or step of shaping the form section A to give it a suitable or desired contour. The form section A is flexed or bent to bring the edges 30 and 27 together or in adjacent relation. In thus bending or flexing the form section A, a strip 35 of adhesive or gummed paper or parchment is bent or folded over the peripheral edge 32 and is trained along the edge as the form section is bent. The slots 33 in the peripheral portion of the form section allow that portion of the section to be contracted or expanded during the application of the strip 35. When the peripheral portion is contracted as illustrated in Fig. 3 of the drawings, parts of the form adjacent the peripheral edge 32 are lapped one over the other at the slits 33 as illustrated by the broken lines in Fig. 3. It will be apparent that the comparatively long cuts 33 in the flexible form section permit the easy working of the section to give its peripheral portion any desired contour.

When the edge 30 is brought to the edge 27, the tabs 29 are alternately folded against the inner and outer sides of the edge portion 30 in the manner clearly illustrated in Figs. 3, 4, 7, 9, 10 and 11 of the drawings. The strip 35 for finishing the peripheral or outer edge of the form section and for maintaining its outer portion in the desired shape may be sufficiently long to have its ends overlap. During or after the shaping of the outer or peripheral portion of the form section A in the manner just described, the inner or lower portion of the section may be shaped as desired. The opening 26 and the cuts 33 permit the easy bending and shaping of the lower portion of the form section. In the particular case illustrated in the drawings, the inner or lower portion of the form section A is not given any particular or peculiar configuration prior to the closing of the opening 26.

The next step of the method is the closing of the opening 26 in the lower form section A and the reinforcing of the inner or lower portion of the section. An elongate piece of parchment or card-board 36 is applied to the inner side of the form section A so that it covers the opening 26 in the manner illustrated in Fig. 7 of the drawings. A strip 37 of friction tape, gummed tape or adhesive tape is applied to the lower face of the piece 36 and projects from opposite edges of the piece 36. A reinforcing disc 38 is then placed on the piece 36 to be substantially concentric with the opening 26 and is anchored or secured in position by bending the ends of the strip 37 over its upper side in the manner illustrated in Fig. 9 of the drawings. To further hold the disc 38 and to reinforce the lower end portion of the form section A, three strips 39, 40 and 41 of gummed paper, friction tape, or the like, are applied to the inner side of the form section A to completely cover the peripheral portions of the disc 38 and form a triangular structure as shown in Fig. 10. Comparatively short strips 42, 43 and 44 of gummed paper, parchment, or adhesive tape are then applied to the form to overlap the vertices of the triangle formed by the strips 39, 40 and 41. The reinforcing of the form section A includes the placing of two comparatively wide pieces 45 and 46 of parchment or cardboard in cross relation on the outer or lower side of the form section A. The pieces 45 and 46 are crossed over the opening 26 to provide two thicknesses of reinforcing material at the opening. In accordance with the preferred manner of forming the section A, one of the pieces, for example, the piece 46, is arranged so that one of its end parts covers a substantial portion of the seam or connection made by the tabs 29 and edge portion 30. This acts to reinforce the seam or connection.

The covering or closing of the opening 26 and the reinforcing of the lower portion of the form section A completes the assembling of the section A. It will be noted that the application of the several reinforcing pieces or parts may be carried on while giving the lower end portion of the form section A any desired configuration. In the particular case illustrated in the drawings, the finished or completed form section A has a rounded lower end. The method provided by the invention includes the treating of the form section A to give it strength and rigidity so as to properly support or carry the inner and outer coatings of plastic material. The form section A is completely immersed in a suitable liquid hardening composition 48 held in a container 47ª. The form section A is permitted to remain in the composition 48 a suitable period of time and is then removed and allowed to dry.

After the lower form section A has dried after its removal from the hardening composition 48, the inner layer or coating 49 of plastic material or potters clay is applied to its inner side. The material 49 may be applied in any suitable manner, for example, it may be applied by hand and given a suitable smooth surface. After the application of the inner coating of material, the lower form section A is put aside to allow the plastic material to dry or harden.

The next step in the method is the forming or shaping of the upper form section B. As initially provided or constructed, the upper form section B is a substantially C-shaped flat blank 52 of card-board, parchment or other suitable bendable material. The section B of the form has a peripheral edge 59 curved about a central point and has a central opening 53. The opening 53 is preferably round and comparatively large in diameter. A passage or gap extends from the opening 53 outwardly to the peripheral edge 59 and has substantially vertical edges 54 and 55. In accordance with the invention, a plurality of equally spaced slits or cuts 60 is provided in the peripheral portion of the form section B. The cuts 60 are preferably of substantial length so that the major portion of the form section B may be readily flexed and shaped. A plurality of spaced cuts 56 extends inwardly from the edge 54 to provide a plurality of tabs 58.

The method next provides for the forming or shaping of the form section B which is adapted to be bent or flexed so that the edge 55 is brought to the edge 54 so that the alternate tabs 58 may be arranged on the inner and outer sides of the blank adjacent the edge 55. This bending or flexing of the form section B may be accompanied by shaping the peripheral portion to give it any desired contour. The form section B is constructed so that its peripheral portion may be contracted by overlapping the parts adjacent the slits 60 as indicated at 63 in Fig. 14 of the drawings. During or immediately after the shaping of the form section B, a strip 62 of gummed paper, adhesive tape, parchment, or the like, is folded over the upper or peripheral edge 59 of the section and is trained along the edge in the manner illustrated in Fig. 14 of the drawings. It will be apparent how the portions of the form section B adjacent the slits or cuts 60 may be overlapped to provide for the construction of the section to give it any desired contour or configuration.

The method provided by the invention includes the assembling of a neck form section N on the upper form section B. The opening 53 in the form section B provides the opening in the upper end of the vase or article and the neck N is arranged on the section B around the opening. The neck section N of the form is initially a substantially flat blank of parchment or cardboard and is substantially C-shaped in plan elevation. The neck blank N has a radial edge 64 provided with a slit 65 forming two tabs 66 and 67. In shaping the neck blank N, it is flexed or bent to bring the radial edge 68 to the edge 64 so that the tab 67 engages the inner side of the form section at the edge 68 and the tab 66 seats at the outer side of the form section adjacent the edge 68. The peripheral portion of the neck section N is formed or shaped to facilitate the connection of the neck section with the upper form section B. A plurality of spaced cuts 76 is provided in the peripheral portion of the neck section N to provide spaced pairs of tabs 71 and 72. The blank or form section N is scored or cut between the pairs of tabs 70 and 71 to provide V shaped tongues 73. As the neck section N of the form is flexed or bent to give it its final shape, the V shaped tongues 73 are bent inward so as to engage against the inner side of the form section B at the opening 53 while the outer tabs 71 and 72 are seated against the outer side of the section B. The manner of assembling the neck section N on the section B is clearly illustrated in Fig. 16 of the drawings. When the neck section N has been completely trained around the edge of the opening 63, the edge portion 63 is inserted in the cut 65 so that the ends of the section N are locked together. A piece 74 of gummed paper, or the like, may be applied over the seam formed at the abutting edges 68 and 64.

After the neck section N of the form has been applied to and attached to the upper form section B, the section B is immersed in a liquid hardening composition 75 held in a suitable open topped container 76. The form section B is removed from the hardening composition after a pre-determined time and is permitted to thoroughly dry. The next step of the method is the application of a layer 88 of clay or plastic material to the inner side of the form section B. The inner coating of plastic material preferably completely covers the inner side of the form section B and the attached neck form section N as illustrated in Fig. 20 of the drawings. The form section B may then be set aside to allow the inner coating of plastic material 77 to thoroughly dry.

When the inner coating 77 has dried, the two upper edge portions of the lower section A and the edge 59 of the upper section B are provided with coatings of plastic material, and the upper section B is inverted and the two buttered edges of the sections brought together to form a joint 78. Any excess material that may be forced into the inner side of the article at the joint 78 may be removed or smoothed down. After the joint 77 has sufficiently hardened, a continuous outer coating 79 of plastic pottery material is applied to the joined sections A and B. The outer coating 79 may have a smooth outer surface or may be formed with any suitable type of surface design or ornamentation. It is preferred to thicken the outer coating 79 at the lower end of the section A to provide a base as illustrated in Fig. 22 of the drawings. The outer surface of the coating 79 may be painted or decorated as at 80. The article is then in condition to be finally dried and baked or fired in the usual manner.

From the above description of the method provided by the present invention, it will be apparent that the article of pottery includes two sections arranged one above the other and joined by a connection 78. The two sections or parts of the article are proportioned and related to one another so that they may be joined to provide a continuous symmetrical exterior. The article consists of the two sections, each having an internal form of card-board, parchment, or other flexible material coated on its inner side with a layer of plastic pottery material. The two interiorally coated sections, after being joined by the connection 78, have the continuous single outer layer or coating of plastic material which finally and completely joins them together. The article may be made particularly attractive and ornamental, and if desired, may be made to simulate any given or specific article or design.

The method of the invention may be very easily carried out by persons unskilled in the art of pottery making and may be practiced without special tools or equipment. The form blanks or form sections A, B and N are simple and inexpensive of manufacture and are constructed so that they may be very easily given various shapes or contours.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. The method of making pottery including, providing a substantially C-shaped strip of flexible imperforate material, then connecting the ends of the strip together, then attaching a bottom forming member to the strip to cover the opening therein to provide a first section, then providing a second substantially C-shaped strip, connecting the ends of the second strip together, attaching a strip to the outer peripheral portion of the said second strip to provide a second section with a flared open end and a reduced end with an opening, applying plastic material to the inner sides of the sections to form the inner wall of the pottery, placing the second section on the first section with the edge at the said open end seating on the upper edge of the first section, and finally applying plastic material to the outer surfaces of the two sections and working the same into shape to form the exterior walls of the pottery.

2. The method of making pottery including, forming a bendable form section so that it may be flexed or bent into various shapes when two of its edges are brought together, bending the section to bring said edges together at the same time giving the section a symmetrical shape, connecting said edges to maintain the section in said shape, and then applying plastic material to the surfaces of the sections.

3. The method of making pottery including, providing a bendable form section with a substantially central opening and a passage extending from the opening to the outer edge of the section, bending the section to bring the edges of the passage together at the same time giving the section a symmetrical shape by contracting it adjacent its outer edge, connecting the portions of the section adjacent the edges of the passage together to hold the section in said shape, and then applying plastic material to the surfaces of the section.

4. The method of making pottery including, providing a bendable form section with a substantially central opening and a passage extending from the opening to the outer edge of the section, bending the section to bring the edges of the passage together at the same time giving the section a symmetrical shape by contracting it adjacent its outer edge, attaching a strip to the outer edge portion of the section to retain it in shape, connecting the portions of the section adjacent the edges of the passage to keep the section bent, and then applying plastic material to the surfaces of the section.

5. The method of making pottery including, providing a bendable form section with a substantially central opening and a passage extending from the opening to the outer edge of the section, bending the section to bring the edges of the passage together at the same time giving the section a symmetrical shape by contracting it adjacent its outer edge, connecting the portions of the section adjacent the edges of the passage together to hold the section in said shape, attaching a member to the section to close said opening, and then applying plastic material to the surfaces of the section.

6. The method of making pottery including, providing a bendable form section having a scored contractible outer portion, a substantially central opening and a passage extending from the opening to the outer edge, bending the section by bringing the edges of the passage together, contracting the outer edge portion of the section, attaching a strip to the said outer edge portion to maintain the section in the desired shape, attaching a member to the section to cover said opening, and then applying plastic material to the surfaces of the section.

7. The method of making pottery including, providing a bendable form section having a scored contractible outer portion, a substantially central opening and a passage extending from the opening to the outer edge, bending the section by bringing the edges of the passage together, contracting the outer edge portion of the section, attaching a strip to the said outer edge portion to maintain the section in the desired shape, attaching a member to the section to cover said opening at the same time rounding and contracting the portion of the section adjacent the opening, and then applying plastic material to the inner and outer surfaces of the section.

8. The method of making pottery, comprising the providing of a pliant form section with contractible inner and outer edge portions, bending the section into a symmetrical shape by bringing portions of the section together, contracting either one or both of said edge portions to give the section a curved longitudinal cross section, and then applying plastic material to the surfaces of the section.

9. The method of making pottery, comprising the providing of a pliant form section with a contractible edge portion, bending the section into the form of a tube by bringing portions of the section together, contracting said edge portion to give the section a curved longitudinal cross section, attaching a member to the section to close one of its ends, and then applying plastic material to the surfaces of the section.

10. The method of making pottery, comprising the providing of a pliant form section with a contractible edge portion, bending the section into the form of a tube by bringing portions of the section together, contracting said edge portion to give the section a curved longitudinal cross section, attaching a member to the section to maintain it in shape, and then applying plastic material to the surfaces of the section.

11. The method of making pottery, comprising the providing of a pliant form section with a contractible edge portion, bending the section into the form of a tube by bringing portions of the section together, contracting said edge portion to give the section a curved longitudinal cross section, attaching a member to the opposite edge portion of the section to contract the same and close the end of the section, and then applying plastic material to the surfaces of the section.

12. The method of making pottery, comprising the providing of a pliant form section with a contractible edge portion, bending the section into the form of a tube by bringing portions of the section together, contracting said edge portion to give the section a curved longitudinal cross section, attaching a member to said edge portion to hold it contracted, and then applying plastic material to the surfaces of the section.

13. An article of pottery of the character described, including two parts, each part including a form section and layers of clay on the inner and outer surface of the section, and a joint connecting the two parts.

14. An article of pottery of the character described, including two parts, each part including a form section of parchment or the like, and coatings of clay on the inner and outer surfaces of the section, one part having a closed lower end and an enlarged open upper end, the other part having an enlarged open lower end seating on the upper end of the first mentioned part, and a reduced open neck at the other end, and a connection between the abutting ends of the parts.

15. A form for a pottery article, including a form section of flexible material having a substantially central opening, the outer edge portions of the section being scored to be contractible.

16. A form for a pottery article, including a form section of flexible material having a substantially central opening, an outer edge substantially concentrically curved about the opening and a cut extending from the opening to the said outer edge, the portion of the section adjacent said outer edge being scored so as to be contractible.

17. A form for a pottery article, including a form section of flexible material having a substantially central opening, an outer edge substantially concentrically curved about said opening, and a passage extending from the opening to the said outer edge, the portion of the section adjacent said outer edge being scored to be contractible when the edges of said passages are brought together.

18. A form for a pottery article, including a form section of flexible material having a substantially central opening, an outer edge substantially concentrically curved about said opening, and a passage extending from the opening to the said outer edge, the portion of the section adjacent said outer edge and the portion of the section adjacent said opening being scored to be contractible when the edges of said passages are brought together.

19. The method of making pottery including, providing two substantially C-shaped form sections of flexible material, bringing the radial edges of the sections together to bend the sections into tubes, contracting the large end portions of the sections to make them curved in longitudinal cross section, attaching a member to one section to close its small end, attaching an upstanding member to the small end of the other section to provide a neck, applying plastic material to the interiors of the sections, connecting the edges of the large ends of the sections, and then applying plastic material to the outer surfaces of the joined sections.

ALBERT L. ROSE.
MAE G. TARTER.